United States Patent Office 2,876,129
Patented Mar. 3, 1959

2,876,129
PROCESS OF MAKING TRANSPARENT LUMINESCENT SCREENS

Jürgen Rottgardt, Stuttgart-Sud, Germany, assignor to International Standard Electric Corporation, New York, N. Y., a corporation of Delaware No Drawing. Application February 2, 1954
Serial No. 407,799

Claims priority, application Germany February 5, 1953

5 Claims. (Cl. 117—33.5)

The invention relates to transparent luminous screens for television picture tubes.

Transparent luminous screens have the advantage that in lighted rooms there occurs no decrease of the picture contrast, because the light existing in the room is capable of freely passing through such a luminous screen and is completely absorbed by the anode blackening applied to the inside wall of the bulb. Hence only the light of the luminous substance can reach the eye of the viewer, and the non-illuminated portions of the luminous screen will remain dark: they will appear black.

Some types of transparent luminous screens are already known in accordance with the prior art, and are manufactured by converting a transparent film of zinc-fluoride into zinc-sulphite by heating in a hydrogen sulphide atmosphere. Further it is known to vaporize the halogenides of the metals in a vacuum in such a way that the resulting film or layer exhibits a glass-like structure. The halogenides of alkali and alkaline earth metals, for instance, KBr or $ZnF_2$ form luminous substances by nature and could, therefore, be employed as transparent luminous substances. However, the following reasons argue against their employment:

(1) The efficiency of light evolution of the illuminated alkali-halogenides is very low,
(2) The emission of light causes a change of color of the material, and
(3) The screens which are produced of alkali-halogenides are to a large extent hygroscopic and are, therefore, easily decomposed in air.

The halogenides of the remaining metals of the first and second group of the periodic system of elements display a similar behavior. For this reason it is necessary to convert the transparent luminous screens produced of halogenides in a way preventing the above mentioned disadvantages. One example of such a conversion, the one of changing zinc-fluorides into zinc-sulphites in a hydrogen sulphide atmosphere, has already been mentioned in the foregoing. However, this method is also accompanied by great difficulties, because said conversion of the zinc-fluoride film into a transparent zinc-sulphite film will only be successful when critical operating conditions are strictly observed. To avoid these difficulties, it is proposed in the present invention to vaporize a metal halogenide, for instance, Be-fluoride, Zn-fluoride, Mg-fluoride, Ca-fluoride, onto a transparent base of silicates, e. g. glass, and to convert this metal halogenide, by means of a common annealing process (heating and then cooling) with the said base, into the silicate of the metal. It is possible to vaporize the activator, e. g. Ag, Cu, Sb, Ti, Mn, together with the halogenide, but of course, it may also be added to the halogenide layer subsequent to the vaporization thereof. The completely transparent halogenide layers on the glass base are tempered (annealed) together with said base in a protective gas (such as nitrogen or any other inert gas) or air atmosphere. Thereby there will appear a reaction of the halogenides with the glass base and/or the surrounding atmosphere in such a way that the metal silicate will be created, without the glass-like structure of the film of luminous substance suffering a change. If the production of the luminous screen is supposed to be performed in the envelope of a picture tube, then the vaporization will be carried out in the inside of the glass bulb under vacuum, in which case the evaporator cups will be glowed from the outside, for instance, by means of high-frequency. Thereby the vaporizer will be so arranged that the critical angle of vaporization will be observed (i. e. the angle between the normal on the front plate and the direction of the molecule beam must be from 0 to 60°). The tempering of the layer of luminous substance for the purpose of obtaining a conversion, will be performed in the envelope of the tube, in which a protective gas will be let in, if so required.

In one specific example of the present invention a glass envelope, in which the glass includes a mixture of silicates, is provided of the type which is used as the bulb of a television cathode-ray tube. The evaporator cup, filled with the zinc-fluoride in powder form, is introduced into this envelope, the bulb is evacuated on a pump and then the evaporator cup is glowed by high-frequency currents until the zinc-fluoride is vaporised. In this case the activator Mn was introduced into the Zn-fluoride ($ZnF_2$) during the preparation of the $ZnF_2$. By keeping the base of the envelope cooler, for example by means of cooling with air, the vaporized fluoride will precipitate onto the glass base to produce a thin layer of zinc-fluoride thereon. This layer of zinc-fluoride is changed into zinc-silicate by heating the base and the zinc-fluoride by means of putting the glass bulb into an oven, and by heating it from room temperature to a temperature above 350° C. and below 650° C. for a period of from minimum 30 to maximum 120 minutes, and then cooled down again to room temperature by taking the bulb out of the oven. In one specific example the base and the fluoride layer were heated to a temperature of 390° C. for a period of 90 minutes, in an atmosphere of air. In the time when the oven comes to a temperature of 100° C., the bulb will be cut off and air is filled into the bulb. The resulting product was a zinc silicate due to the combination of zinc with the silicates of the glass. This heating could have been done in an inert atmosphere such as nitrogen or any of the rare inert gases such as argon, neon, xenon and krypton. During the heating the zinc-fluoride breaks down and it is believed that the fluorine escapes in the form of gas. The activator Mn, which is brought onto the zinc-fluoride during the preparation of it, migrates into the zinc silicate layer during the tempering process.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In the process of making a transparent luminous screen for television picture tubes having a transparent glass base consisting of silicates, the steps comprising depositing a metal fluoride onto the said base and heating the base and fluoride to convert it into a layer consisting essentially of a silicate of said metal.

2. The process according to claim 1 wherein said metal fluoride is vaporized on to the glass base.

3. The process according to claim 1 wherein said metal fluoride is zinc-fluoride which is converted into a zinc silicate.

4. The process according to claim 1 in which said fluoride is deposited by vaporizing it in a vacuum.

5. The process according to claim 1 wherein the fluoride layer is converted by tempering the fluoride layer and the glass base at temperatures up to 650° C.

References Cited in the file of this patent

UNITED STATES PATENTS

| 2,123,939 | Germer | July 19, 1938 |
| 2,511,572 | Ellefson | June 13, 1950 |
| 2,542,122 | Ellefson | Feb. 20, 1951 |
| 2,558,532 | Banca | June 26, 1951 |
| 2,600,579 | Ruedy et al. | June 17, 1952 |
| 2,659,678 | Cusano et al. | Nov. 17, 1953 |
| 2,721,950 | Piper et al. | Oct. 19, 1955 |